United States Patent [19]

Murayama et al.

[11] Patent Number: 4,656,234

[45] Date of Patent: Apr. 7, 1987

[54] DIELECTRIC FILM FOR CAPACITOR AND PROCESS FOR PRODUCING SAME

[75] Inventors: Naohiro Murayama, Fukushima; Haruko Kakutani, Chiba; Toshiya Mizuno, Fukushima; Kenichi Nakamura, Fukushima; Syuji Terasaki, Fukushima, all of Japan

[73] Assignee: Kureha Kagaku Kogyo Kabushiki Kaisha, Tokyo, Japan

[21] Appl. No.: 668,654

[22] Filed: Nov. 6, 1984

Related U.S. Application Data

[63] Continuation-in-part of Ser. No. 536,896, Sep. 28, 1983, abandoned.

[30] Foreign Application Priority Data

Oct. 1, 1982 [JP] Japan .................... 57-173634

[51] Int. Cl.$^4$ .................................... C08F 14/22
[52] U.S. Cl. .................... 526/255; 264/563; 264/564
[58] Field of Search ................ 526/255; 264/563, 564

[56] References Cited

U.S. PATENT DOCUMENTS

| | | | |
|---|---|---|---|
| 3,707,592 | 12/1972 | Ishii et al. | 526/255 |
| 3,850,900 | 11/1974 | Sagawa | 526/255 |
| 3,878,274 | 4/1975 | Murayama et al. | 526/255 |
| 3,990,824 | 11/1976 | Behr | 264/564 |

FOREIGN PATENT DOCUMENTS

1533050 9/1979 United Kingdom.

OTHER PUBLICATIONS

U.S. patent application Ser. No. 256,839, filed 4/23/81.
European Search Report from EP 83305952.0.

*Primary Examiner*—Paul R. Michl
*Attorney, Agent, or Firm*—Armstrong, Nikaido, Marmelstein & Kubovcik

[57] ABSTRACT

Vinylidene fluoride polymer films are provided having improved dielectric constants and tan $\delta$ values and which do not exhibit substantial shrinkage when heated to temperatures below the crystalline melt point. Processes for preparation of such films are presented.

9 Claims, 2 Drawing Figures

DIELECTRIC FILM FOR CAPACITOR AND PROCESS FOR PRODUCING SAME

CROSS REFERENCE TO RELATED APPLICATION

This application is a continuation-in-part of application Ser. No. 536,896, filed Sept. 28, 1983, which application is now abandoned and is incorporated herein by reference.

BACKGROUND OF THE INVENTION

1. Field of the Invention

This invention relates to dielectric films for capacitors and the like comprising vinylidene fluoride polymer, having improved electrical and optical properties. This invention also relates to processes for producing such films.

2. Brief Description of the Prior Art

Films comprising vinylidene fluoride polymer have high dielectric constants and permit small-sized capacitors to be formed using the films as a dielectric material. Ordinary melt-extruded films, cast films prepared through solvent evaporation, and pressed films have dielectric constants (or relative permittivities) of up to only about 9–10 at room temperature and at a frequency of about 1 KHz however. Higher dielectric constants are desired. Moreover, the dielectric loss, tan δ, at room temperature and at a low frequency region below commercial frequencies is typically more than about 3–5%.

To increase the dielectric constant and reduce tan δ of films of vinylidene fluoride polymers, an improved process of stretching formed, unoriented or unstretched film at least in one direction and of setting or fixing it has been developed heretofore and put to practical use (see Japanese Patent Publication No. 17680/1975). The film prepared by this method has an improved tan δ of less than about 3% at low frequency regions and improved dielectric constants, higher than about 10–11 at room temperature and at about 1 KHz, as compared with that of unstretched film. However, the stretched and oriented film has a tendency to shrink upon heating. While shrinkage can be avoided by heat treating the stretched and oriented film at temperatures approaching the crystalline melting point of the film, the molecular orientation of the resin in the film may be varied thereby with concomitant changes in the physical properties of the film. Accordingly, it has not been possible to obtain a capacitor making use of stretched films of vinylidene fluoride polymers free from heat shrinkage at temperatures up to about the crystalline melting point of the polymer. Thus, films of vinylidene fluoride polymer having improved dielectric properties such as increased dielectric constants and lower tan δ, obtained by stretching operations, were liable to experience significant and irreversible changes in dielectric properties owing to shrinkage.

Further, in some cases, the dielectric constant of the stretched and oriented vinylidene fluoride polymer film as measured between commercial frequencies and 1 KHz remarkably increases as the temperature rises from about 0° C. to about 80° C. For instance, it indeed shows an increase of greater than about 10% between 20° C.–80° C., and greater than about 30% between 0° C.–80° C. If the dielectric constant of the dielectric material in a capacitor changes, this causes the change in electrostatic capacitance and, further, various properties of a circuit using this capacitor may vary. Furthermore, if an irreversible change occurs due to heat shrinkage or the like, it becomes impossible to forecast the temperature-dependent change in the electrical constant of the circuit, rendering devices made thereby useless.

It is known that the stretching operation for improving the dielectric property of films of vinylidene fluoride polymer causes the conversion of crystal form between the two main crystal structures of the vinylidene fluoride polymer, that is, from alpha-form ("II-phase") to highly polar beta-form ("I-phase"). It is also known that, when exposed to a high electric field, vinylidene fluoride polymer of the beta-form exhibits high piezoelectric and pyroelectric properties. For example, when vinylidene fluoride polymer film of the beta-form is used for a surge absorber in an electronic circuit, if it is subjected to a dielectric strength test under the application of a high voltage before mounting or exposed to a considerably high voltage which is lower than the dielectric strength after mounting, the piezoelectric and pyroelectric properties are given to the film. Since undesired phenomena such as generation of noise signals may thus be caused by changes in the ambient temperature, the provision of such piezoelectric and pyroelectric properties is usually to be avoided in application of the film for capacitors.

In addition, most of the unstretched or unoriented vinylidene fluoride polymer films contain spherulites, and the oriented films prepared by stretching these spherulites often have uneven surfaces and poor optical tranparencies. It is thus desired to eliminate such unevenness, for improving the characteristic properties such as dielectric strength required for electrical materials such as capacitors.

The present inventors have discovered methods to prepare dielectric films from vinylidene fluoride polymers having improved dielectric constants and improved tan δ without the foregoing undesirable properties.

OBJECTS AND SUMMARY OF THE INVENTION

It is an object of this invention to provide dielectric films, such as for capacitors, having improved electrical, optical and mechanical properties comprising vinylidene fluoride polymer.

It is another object of this invention to provide processes for producing such dielectric film.

These and other objects are achieved in accordance with this invention.

The present invention relates to dielectric films, such as for capacitors, comprising vinylidene fluoride polymer, preferably formed essentially from vinylidene fluoride. The polymer comprises alpha-form crystal structure in major proportion of the crystal forms and has, in a crystal region, a degree of orientation, $\pi$, of the molecular axes in the direction parallel to the film surface of from about 0.8 to about 1.0. The film, when heated from room temperature up to temperatures below the melting point of the polymer film exhibits substantially improved heat shrinkage, preferably substantially none.

The present invention also relates to processes for producing dielectric film for capacitors as defined above by inflation methods.

DETAILED DESCRIPTION OF THE PREFERRED EMBODIMENTS

Figure 1:
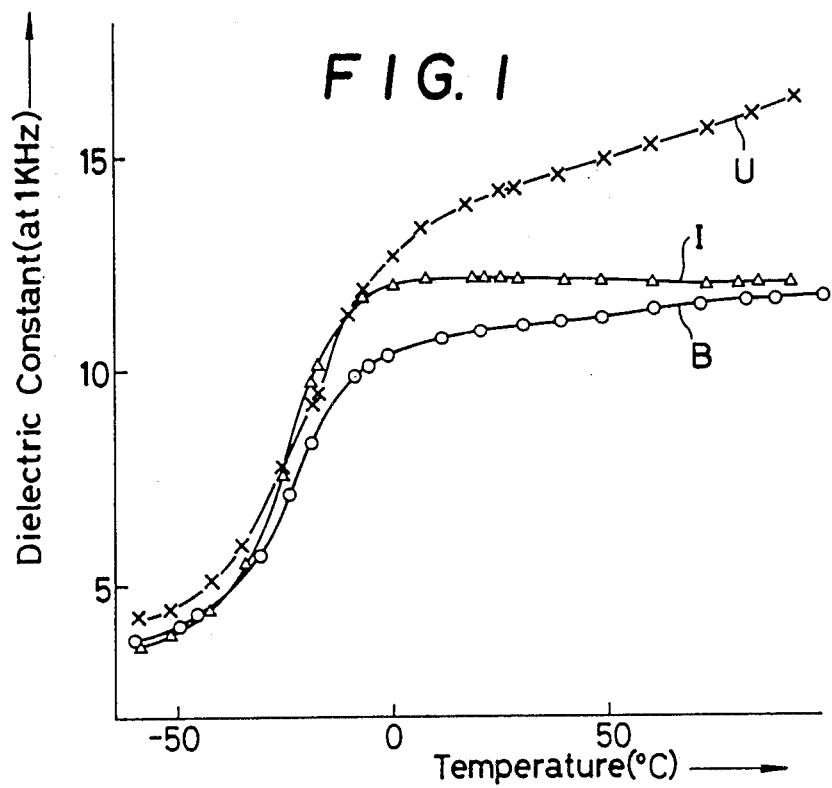
FIGS. 1 and 2 are graphs illustrating the effects of this invention and showing the temperature-dependent changes of dielectric constant and tan δ, both measured at 1 KHz, respectively.

The term "vinylidene fluoride polymer" as used herein denotes not only a vinylidene fluoride homopolymer, but also vinylidene fluoride copolymers. Vinylidene fluoride copolymers useful in the practice of the invention are copolymers of more than about 70 mol %, preferably more than about 75 mol %, and even more preferably more than about 80 mol % of vinylidene fluoride monomer units with olefin monomer units copolymerizable with vinylidene fluoride, such as halogenated olefins. Preferable examples of suitable halogenated olefins are, for example, fluorinated olefins, such as vinyl fluoride, trifluoroethylene, trifluorochloroethylene and tetrafluoroethylene.

Vinylidene fluoride polymers used in accordance with the invention preferably have inherent viscosities of from about 0.8 to about 1.8 dl/g, and preferably about 1.0 to 1.4 dl/g. With an inherent viscosity lower than the foregoing limits, the vinylidene fluoride polymer generally has too low of a melt viscosity at the melt extrusion stage, which makes it difficult to effect smooth taking up and winding of a uniform film. Also, significant relaxation of molecular orientation occurs at the winding stage, and thus the desired oriented structure is difficult to obtain. On the other hand, with an inherent viscosity higher than the foregoing upper limits, the vinylidene fluoride polymer will generally have too high of a melt viscosity which makes it difficult to effect smooth extrusion. Even if such vinylidene fluoride polymer can be extruded, undesirable melt fracture frequently occurs under conventional extrusion conditions.

The inherent viscosity ($\eta_{inh}$) referred to above is a value derived from the following equation:

$$\eta_{inh} = \frac{1}{C} \ln \frac{\eta}{\eta_o}$$

wherein $\eta$ = viscosity of the solution of the vinylidene fluoride polymer in dimethylformamide at a concentration of 0.4 g/dl at 30° C.;
$\eta$ = viscosity of pure dimethylformamide at 30° C.;
C = concentration (=0.4 g/dl).

It is preferred that dielectric films according to this invention comprise vinylidene fluoride polymer alone. Other polymeric materials and additives which are compatible with the vinylidene fluoride polymer and with the objects of this invention can be admixed to an extent such as not to impair the performance of the vinylidene fluoride polymer. Such polymeric materials include, for example, polymethylmethacrylate and polyethylene halides.

Although the films according to this invention may optionally be treated, for example, by heat-treatment to such an extent as not to impair the high dielectric constants of the films, cross-linking treatment is usually undesired for attaining a high dielectric constant.

The dielectric films according to the present invention are prepared by a method in which vinylidene fluoride polymer which has been highly flow-oriented in a molten state is solidified. Since the film is solidified from the molten state, a major proportion of the crystal forms of the vinylidene fluoride polymer are of the alpha-form. Further, since the film is solidified from the highly flow-oriented molten resin, most of the molecular axes in the crystal region are oriented parallel to the plane of the film. Since the orientation of the crystal has not resulted from a stretching operation, the film exhibits substantially no heat shrinkage at any temperature region in the course of temperature rise from ambient temperature up to a temperature just below the crystalline melting point of the polymer.

Dielectric films of this invention comprise vinylidene fluoride polymers having predominately the alpha-form which may contain minor amounts of the beta-form or of other crystal forms. It is preferred that the composition of the crystal structure have an infrared absorption ratio $D_{530}/D_{510}$ of greater than about 3, wherein $D_{530}$ represents the characteristic absorption at 530 cm$^{-1}$ for the alpha-form and $D_{510}$ the characteristic absorption at 510 cm$^{-1}$ for the beta-form in the infrared absorption spectrum.

The degree of orientation of the molecular axes in the crystal region can be determined from the film edge by means of X-ray diffractometry. For example, films laminated to a thickness of about 1 mm and bonded together with an adhesive are cut out into a square post with 1×1 (mm$^2$) area and photographed by irradiation by X-rays at an angle of about 16° C. with respect to a line perpendicular to the plane of the film edge. The half-width, $\Delta 2\Theta$, is determined for a diffraction arc of (002) plane of the alpha-form by means of a microdensitometer generally in accordance with Leroy E. Alexander, "X-ray Diffraction Method in Polymer Science," John Wiley & Sons, New York, 1969. The degree of orientation, $\pi$ of the molecular axes in the direction parallel to the film surface is determined as:

$$\pi = \frac{180 - \Delta 2\theta}{180}$$

It is preferred that the dielectric films comprising vinylidene fluoride polymer of this invention have degrees of orientation, $\pi$, of the molecular axes in the crystal region ranging from about 0.8 to 1.0.

Further, it is desired that the crystal region of the vinylidene fluoride polymer of the dielectric films according to this invention have the molecular axes anisotropically oriented also in the plane of the film. The anisotropy can be detectable by X-ray diffraction, by the birefringence index or by dichroic ratio in the infrared absorption spectrum. When X-ray diffractometry is used, the anisotropy can be determined from the diffraction pattern obtained by irradiation of X-rays perpendicular to the plane of the film. It is usually convenient, however, to detect the anisotropy from the dichroic ratio in the characteristic infrared absorption band. At 530 cm$^{-1}$ which is one of the characteristic absorption bands for the alpha-form, when the incident infrared rays are perpendicular to the plane of the film, the absorption intensity of the infrared rays polarized in the direction perpendicular to the orientation direction of the molecular axes is greater than that of the infrared rays polarized in the direction parallel to the molecular axes. When D-parallel represents the absorbance of the infrared rays perpendicular to the plane of the film and polarized in the direction parallel to the film winding direction and D-perpendicular represents the absorbance of the infrared rays perpendicular to the plane of the film and polarized in the direction perpendicular to the film winding direction and the plane of the film, if the dichroic ratio D-perpendicular/D-parallel, is greater than about 1, most of the molecular axes are oriented in the direction parallel to the film winding direction; if the ratio D-perpendicular/D-parallel equals 1, there is no anisotropy in the directions perpendicular to and parallel to the winding direction; and if the ratio is less than 1, most of the axes are oriented in the direction perpendicular to the winding direction. It is preferred that films according to this invention have vinylidene fluoride polymer crystal regions with the dichroic ratio D-perpendicular/D-parallel, of other than 1 and, more preferably, greater than about 1.3.

A further feature of the films according to this invention is that they exhibit substantially no heat shrinkage at temperatures up to about the crystalline melting point of the film. Ordinary stretched and oriented polymeric films for capacitors often shrink when they are reheated to the stretching temperature or up to about the heat-treatment temperature, while the films according to this invention exhibits substantially no heat shrinkage even when it is heated up to a temperature just below the melting point of the crystal in spite of the fact that the molecules are oriented, because the film according to this invention has not been oriented by post-stretching. With films according to this invention having improved electrical properties, it is essential that substantially no heat shrinkage be caused by heating up to temperatures below the melting point, that is, the heat expansion coefficient of the film in the course of the temperature rise should always be positive up to a temperature just below the melting point.

Further, while films comprising vinylidene fluoride polymers according to this invention comprise in major proportion of the crystal forms the alpha-form, the dielectric constant is comparable with that of the highly polar beta-form film, that is, they have dielectric constants greater than about 11 at 20° C. and 1 KHz. The dielectric constant shows less variation above and below room temperature and its variation between 20° to 80° C. is within ±5% of the half value of the sum of a dielectric constant measured at 20° C. and that measured at 80° C., at 1 KHz.

Furthermore, since films according to this invention have not been prepared by stretching sheets containing spherulites once formed, it has an excellently uniform surface and good transparency.

In films according to this invention, the insulation resistance can be varied over a wide range without changing the chemical structure of the film. Films having insulation resistance of less than $10^{12}$ ohm cm up to about $10^{15}$ ohm cm generally can be prepared as required.

The films according to this invention can be produced, for example, by an inflation method, such as, by extruding vinylidene fluoride polymer in a molten state from a die such as a circular die into a tubular form, and introducing, into the hollow polymer air or gas or a liquid which is insoluble to the extruded polymer through the die slit from the outside to the inside of the polymer tube. Inflation of the tubular body is maintained while the molten vinylidene fluoride polymer is cooled and crystallized. It is then pinched and taken up through pinch rolls. In order to attain a high degree of orientation, it is preferred that the polymer extruded from the die be drawn in the take-up direction by a factor of greater than 5, preferably greater than 10, and more preferably greater than 30, as compared with the lateral direction perpendicular thereto when the polymer, after the solidifying step, is taken up by the pinch rolls. Furthermore, in order to take up efficiently films having a large area, it is also desired that the lateral length be greater than the die diameter by a factor of more than 0.8, preferable 0.9–3.0 and more preferable 1.0–2.5. Although film in accordance with this invention can be produced in this way, it will be apparent that other methods can also be employed.

Although the thickness of films in accordance with this invention may be greater than about 50 μm, it is convenient that the film thickness be less than about 50 μm when used as electrical material.

The advantageous effects and other details of this invention will now be further described by referring to Examples embodying this invention and Comparative Examples.

EXAMPLE 1

A vinylidene fluoride homopolymer ($\eta$inh=1.0 dl/g) was extruded in a molten state from a circular die having a diameter of 150 mm and a clearance of 2 mm into a tubular form, and air was then introduced from the outside through the die slit to the inside of the tubular body to maintain the molten tubular vinylidene fluoride homopoymer in a inflated state until it cooled and solidified to crystallize. The solidified tube was taken up through pinch rolls. The process was carried out at the extrusion rate of 300 g/min, the take-up speed of 36 m./min, the temperature of the melt at the die exit of 250° C. and the film fold width of 25 cm. The film had a thickness of about 9 μm, which means that the resin extruded from the die slit was drafted by a draft ratio of 209 in the longitudinal direction and by the blow-up ratio of 1.1 in the lateral direction. Further, the film was transparent and comprised mainly the alpha-form, in which the infrared absorption ratio $D_{530}/D_{510}$ was 7, the orientation degree of the molecular axes was 0.91, the birefringence index of $22\times10^{-3}$ and the infrared dichroic ratio of the characteristic absorption at 530 cm$^{-1}$ for the alpha-form was 1.58. As shown in Table 1, the dielectric constant was about 13.8 at 20° C. and about 13.4 at 80° C. (at 1 KHz) with little temperature-dependency. The heat expansion coefficient was always positive in the course of the temperature rise from 20° C. to 170° C.

EXAMPLE 2

A film having a film fold width of 35 cm and a thickness of about 8 μm, which had been prepared through crystallization under flow-orientation in a molten state using the same apparatus as in Example 1, had an infrared absorption ratio $D_{530}/D_{510}$ of 12.9, the orientation degree $\pi$ for the molecular axes within the film plane of 0.92, the birefringence index of $20\times10^{-3}$ and the infrared dichroic ratio at 530 cm$^{-1}$ of 1.6. The dielectric constant was about 12 which was scarcely varided in the course of temperature rise from 0° C. to 90° C. as shown in FIG. 1 (I) and Table 1.

The heat expansion coefficient of the film in the course of the temperature rise was always positive up to above 170° C.

EXAMPLE 3

A film having a film fold width of 12 cm and a thickness of about 4, μm which had been prepared by crystallization under flow-orientation in a molten state from a circular die of 80 mm in diameter using the same procedures as in Example 1 was mainly of the alpha-form and had crystalline orientation degree of 0.96 and infrared dichroic ratio at 530 cm$^{-1}$ of 4.75. The dielectric constant was 12.3 at room temperature(20° C.) and 11.8 at 80° C. (at 1 KHz), which was scarcely changed in the course of the temperature rise as shown in Table 1. Tan δ was less than 1% at 20° C. as shown in Table 2. Further, the heat expansion coefficient of the film was always positive in the course of the temperature rise up to 170° C.

EXAMPLE 4

A film prepared in the same manner as in Example 3 was placed between frames, tensed at room temperature and then heat-treated in an air bath at 150° C. for 30 min. The film remained under no tension at 150° C. When the film was cooled while being placed between the frames nearly to the room temperature and then taken out, it had mainly the alpha-form and the orientation degree for the molecular axes of 0.94 as shown in Table 1. The dielectric constant of the film was 13.8 at 20° C. at 1 KHz; the dielectric constant had no increasing tendency in the course of the temperature rise up to 80° C. at 1 KHz. Further, the film exhibited no heat shrinkage even when it was reheated under a tension free condition up to 165° C. which was higher than the heat-treatment temperature of 150° C.

COMPARATIVE EXAMPLE 1

A film of 7 μm in thickness which had been prepared by monoaxially stretching at 110° C. a sheet of vinylidene fluoride homopolymer melt-extruded through a T-die was mainly composed of the beta-form and had an infrared absorption ratio $D_{530}/D_{510}$ of 0.1. The molecular axes were well oriented, with the orientation degree π being 0.97. The infrared dichroic ratio at 510 cm$^{-1}$ was 3.6. Although the dielectric constant of the film was 14 at 20° C. and 1 KHz as shown in FIG. 1 (U) and Table 1 tan δ was 1.9% as shown in Table 2. The dielectric constant of the film was also greatly increased along with temperature rise from 0° C. to 80° C. as shown in FIG. 1(U). When the film was reheated under a tension free condition heat shrinkage occurred gradually at about 100° C. and, when the temperature was increased up to 130° C. and then returned to the room temperature, the resulting film thickness was ununiform, had a thickness about 20 μm and a dielectric constant of about 9 at 20° C. and 1 KHz.

COMPARATIVE EXAMPLE 2

A film 12 μM in thickness which had been prepared by biaxially stretching an unoriented sheet of vinylidene fluoride homopolymer melt-extruded through a T-die was mainly composed of the alpha-form, while containing a minor amount of the beta-form, and had the infrared absorption ratio $D_{530}/D_{510}$ of 2.3. The orientation degree, π, for the molecular axes of 0.85 and the infrared dichroic ratio at 530 cm$^{-1}$ of 1.6 was exhibited. The film shrank by about 10% at 160° C. The dielectric properties of the film are shown in Tables 1 and 2. The dielectric constant was rather small, 10.8 at 20° C. and 1 KHz, and it continuously increased depending on the temperature rise from 0° C. to 80° C. as shown in FIG. 1, curve B. The temperature-dependent change was remarkable as compared with that in Example 2, curve I.

COMPARATIVE EXAMPLE 3

An unoriented sheet, which had been prepared by melt-extrusion from the T-die used in Comparative Example 2, had a thickness of 80 μm, was mainly composed of the alpha-form and exhibited no heat shrinkage even above 170° C. However, the orientation degree π for the molecular axes was close to zero and the infrared dichroic ratio at 530 cm$^{-1}$ was 1.2. The dielectric constant of the film was as small as 9.0 at 1 KHz and 20° C.

Figure 2:
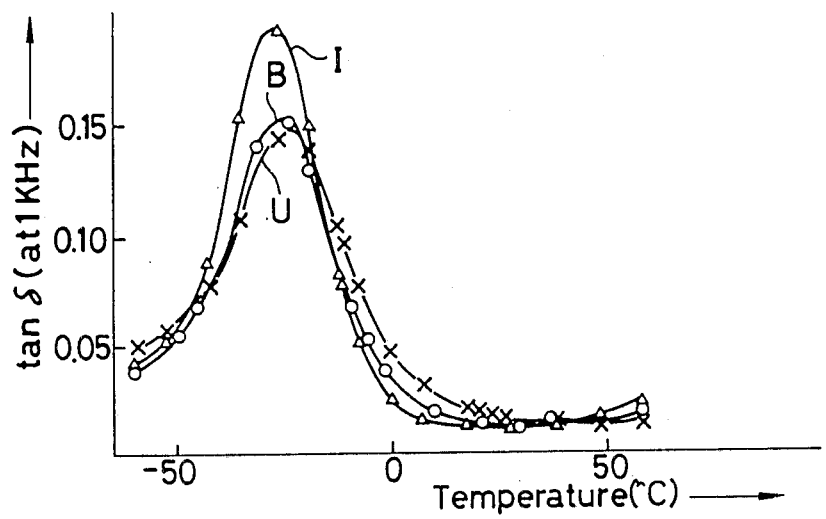

From the comparison between the working examples and the comparative examples in Table 1 and 2, as well as in FIGS. 1 and 2, it is apparent that films according to this invention have high dielectric constants which can be maintained substantially unchanged from room temperature up to about 80° C. and can also provide an effect of decreasing tan δ at temperatures from 0° C. up to about 20° C.

EXAMPLE 5

For the film according to this invention of Example 3 and the biaxially stretched film in Comparative Example 2, the surface property was evaluated based on the measurement of the surface gloss. A digital varying angle glossmeter, type VG-1D, manufactured by Nihon Denshoku Kogyo K.K. was used and both the light projecting angle and light receiving angle were set to 60°. The value indicated on the digitmeter was set to a reference value with a gloss reference plate. Then, the glossiness GS (60°) for the sample to be measured was determined by replacing the reference plate by the sample to be measured. The measured values are given in Table 3, from which it can be seen that the film according to this invention of Example 3 has a greater glossiness and better surface properties as compared with those of the film of Comparative Example 2.

TABLE 1

| Sample | Main crystal form (D530/D510) | Orientation degree, π | Dichroic* ratio (D-perpendicular/ D-parallel) | Volume change by temp (ΔV/ΔT) | Dielectic constant ε(1 KHz) | | |
|---|---|---|---|---|---|---|---|
| | | | | | 0° C. | 20° C. | 80° C. |
| Example 1 | alpha (7) | 0.91 | 1.58 | plus | 13.6 | 13.8 | 13.4 |
| Example 2 | alpha (12.9) | 0.92 | 1.6 | plus | 12.0 | 12.2 | 12.1 |
| Example 3 | alpha (7.2) | 0.96 | 4.75 | plus | 11.9 | 12.3 | 11.8 |
| Example 4 | alpha (13.8) | 0.94 | 4.5 | plus | 13.9 | 13.8 | 13.0 |
| Comparative Example 1 | beta (0.1) | 0.97 | 3.6 | minus at above 90° C. | 12.7 | 14.0 | 15.7 |
| Example 2 | beta (2.3) | 0.85 | 1.6** | minus at above | 10.4 | 10.8 | 11.6 |

TABLE 1-continued

| Sample | Main crystal form (D530/D510) | Orientation degree, $\pi$ | Dichroic* ratio (D-perpendicular/ D-parallel) | Volume change by temp ($\Delta V/\Delta T$) | Dielectic constant $\epsilon$(1 KHz) 0° C. | 20° C. | 80° C. |
|---|---|---|---|---|---|---|---|
| Example 3 | alpha (8) | 0 | 1.2 | 120° C. plus | 8.9 | 9.0 | 10.1 |

*Dichroic ratio at characteristic infrared absorption band for the main crystal form.
**Dichroic ratio for the alpha-form. The dichroic ratio for the beta-form was less than 1.

TABLE 2

| | tan δ (1 KHz) | | |
|---|---|---|---|
| Sample | 0° C. | 10° C. | 20° C. |
| Example 1 | 2.5% | 1.3% | 1.1% |
| Example 2 | 2.4 | 1.4 | 1.1 |
| Example 3 | 2.7 | 1.4 | 0.95 |
| Comparative | | | |
| Example 1 | 4.7 | 2.6 | 1.9 |
| Example 2 | 3.4 | 2.0 | 1.4 |

TABLE 3

| | GS (60°) | |
|---|---|---|
| Sample | Parallel*** | Perpendicular**** |
| Example 3 | 120.2 | 128.3 |
| Comparative Example 2 | 100.1 | 91.1 |

***In the case of light projection and light reception in the direction parallel to the drafting direction or to the stretching direction at the second axis of the film.
****In the case of light projection and light reception in the direction perpendicular to the drafting direction or to the stretching direction at the second axis of the film.

We claim:

1. A dielectric film comprising vinylidene fluoride polymer comprising at least about 70 mole percent vinylidene fluoride monomer units;
    said polymer having crystalline regions comprising in major proportion alpha-form crystal structure;
    said crystalline regions having a degree of orientation, $\pi$, of the molecular axes in the direction substantially parallel to the film surface of from about 0.8 to about 1.0;
    said vinylidene fluoride polymer having an inherent viscosity of from about 0.8 to about 1.8 dl/g as a solution thereof in dimethylformamide at a concentration of 0.4 g/dl at 30° C.;
    said film exhibiting substantially no heat shrinkage when heated from room temperature to a temperature just below the melting point of the polymer.

2. The dielectric film of claim 1, wherein said vinylidene fluoride polymer comprises at least about 75% mol % of vinylidene fluoride monomer units.

3. The dielectric film of claim 1, wherein said vinylidene fluoride polymer comprises at least about 80 mol % of vinylidene fluoride monomer units.

4. The dielectric film of anyone of claims 1, 2, or 3, wherein said vinylidene fluoride polymer has an inherent viscosity of from about 1.0 to about 1.4.

5. The dielectric film of anyone of claims 1, 2, or 3 wherein said film consists essentially of vinylidene fluoride polymer.

6. The dielectric film of claim 1, in which the composition of the crystal structure has an absorption ratio $D_{530}/D_{510}$ of greater than about 3.

7. The dielectric film of anyone of claims 1, 2, or 3 wherein the molecular axes in crystal regions of the film are anisotropically oriented within the plane of the film and the dichroic ratio, D-perpendicular/D-parallel in the characteristic infrared absorption at 530 cm$^{-1}$ of the predominant crystal form is greater than 1.0.

8. The dielectric film of anyone of claim 1, 2, or 3 wherein the dichroic ratio, D-perpendicular/D-parallel, in the characteristic infrared absorption at 530 cm$^{-1}$ of the predominant crystal form is greater than 1.3.

9. The dielectric film of anyone of claims 1, 2, or 3 wherein the dielectric constant is greater than 11 at a temperature of 20° C. and at a frequency of 1 KHz and its variation between 20° to 80° C. is within ±5% of the half value of the sum of a dielectric constant measured at 20° C. and that measured at 80° C., at 1 KHz.

* * * * *